(12) United States Patent
Lin et al.

(10) Patent No.: US 7,014,834 B2
(45) Date of Patent: Mar. 21, 2006

(54) PROCESS FOR PREPARING HYDROGEN THROUGH THERMOCHEMICAL DECOMPOSITION OF WATER

(75) Inventors: Shi-Ying Lin, Tokyo (JP); Hiroyuki Hatano, Tsukuba (JP); Yoshizo Suzuki, Tsukuba (JP)

(73) Assignees: Center for Coal Utilization, Japan, Tokyo (JP); National Institute of Advanced Industrial Science and Technology, Tokyo (JP)

(*) Notice: Subject to any disclaimer, the term of this patent is extended or adjusted under 35 U.S.C. 154(b) by 139 days.

(21) Appl. No.: 10/619,401

(22) Filed: Jul. 15, 2003

(65) Prior Publication Data

US 2004/0024072 A1 Feb. 5, 2004

(30) Foreign Application Priority Data

Jul. 30, 2002 (JP) ............................. 2002-222185

(51) Int. Cl.
*C01B 3/02* (2006.01)
(52) U.S. Cl. .................................. 423/648.1
(58) Field of Classification Search ............... 48/202, 48/210; 423/648.1
See application file for complete search history.

(56) References Cited

U.S. PATENT DOCUMENTS 4,440,546 A * 4/1984 Lancet et al. ............... 48/202

FOREIGN PATENT DOCUMENTS

| EP | 1001002 A2 | 5/2000 |
| JP | 2979149 | 9/1999 |
| JP | 2001-302206 | 10/2001 |

* cited by examiner

*Primary Examiner*—Colleen P. Cooke
(74) *Attorney, Agent, or Firm*—Flynn, Thiel, Boutell & Tanis, P.C.

(57) ABSTRACT

There is provided a process of preparing hydrogen through thermochemical decomposition of water capable of supplying a mixture composed of the impalpable powders of CaO and coal directly to a main reactor. The process of preparing hydrogen through thermochemical decomposition of water, wherein coal powders are caused to react with water in the presence of CaO under a condition of temperature in a range of 600° C. to 800° C. substantially without an oxidizing agent added thereto, thereby reducing water to form hydrogen, said process involving the steps of rendering the coal powders and CaO into impalpable powders to form mixed impalpable powders, feeding steam generated from a steam generator and the mixed impalpable powders to a fluidized bed of a main reactor, and implementing thermochemical decomposition of water in the main reactor by causing the mixed impalpable powders of the coal powders and CaO to undergo grain growth in the fluidized bed while adjusting a steam partial pressure in the main reactor so as to be suited for a condition enabling CaO to form Ca(OH)$_2$.

6 Claims, 4 Drawing Sheets high-pressure reactor system for continuous supply of particulates solids analysis at the inlet (check point ①) of the furnace solids analysis of particles (at check point ②) inside the furnace granulated particulates in a fluidized bed

PROCESS FOR PREPARING HYDROGEN THROUGH THERMOCHEMICAL DECOMPOSITION OF WATER

FIELD OF THE INVENTION

A process for preparing hydrogen by pyrolizing an organic matter such as coal, petroleum, etc. at high temperature under a high pressure, process for preparing hydrogen from water gas, process for preparing hydrogen by electrolyzing water, and so forth have been well known up to date.

The present invention is concerned with a field of such technology for preparing hydrogen as described above, and relates to improvement of a process of selectively preparing hydrogen through thermochemical decomposition of water at high temperature under a high pressure by utilizing heat generated when oxidizing carbon contained in an organic matter.

BACKGROUND OF THE INVENTION

The overview of the process for preparing hydrogen from water in the supercritical state, according to JP, 2979149, B, issued to the present inventors, is described hereinafter.

The reason why a proportion of hydrogen in a gas does not become high even upon pyrolysis of an organic matter at 650° C. in water in the supercritical state described as above is because carbon monoxide, steam, carbon dioxide, and hydrogen, contained in the gas produced due to reaction between the organic matter and the water in the supercritical state, are in chemical equilibrium state. Such equilibrium reaction can be described by a relationship represented by the following chemical formula:

$$CO+H_2O=CO_2+H_2 \tag{1}$$

In this case, if an excessive amount of a matter (CaO), reacting with carbon dioxide under a condition of the temperature and pressure of a reactor, and acting to lock a resultant product in solid form while exerting by itself no effect on the relationship of the chemical equilibrium, is caused to coexist at a reactive field beforehand, an amount of the carbon dioxide in the gas will decrease due to reaction thereof with the matter.

In order to maintain the above-described relationship of the chemical equilibrium by coping with a decrease in the amount of the carbon dioxide, a reaction inevitably proceeds in the direction for producing $CO_2$ and $H_2$ due to a reaction between CO and $H_2O$, whereupon $CO_2$ thus produced reacts with an absorbent for carbon dioxide, thereby being removed from the gas.

As a result, there is finally established chemical equilibrium in a form wherein a minute amount of carbon monoxide and carbon dioxide, respectively, and a large amount of steam and hydrogen, respectively, exist in the gas. By cooling the gas and solids (mixture of ash contained in the organic matter, non-reacting portions of absorbent for carbon dioxide, and solid matter resulting from absorption of the carbon dioxide), the steam reverts to water, so that the hydrogen can be separated. Accordingly, it becomes possible to prepare a gas containing hydrogen as a main constituent thereof from an organic matter.

Now, assuming an absorbent for carbon dioxide as X, a chemical reaction formula in this case can be expressed as follows:

$$C+2H_2O+X=(XCO_2)+2H_2 \tag{2}$$

A hydrogen gas produced originates from water, and an overall chemical reaction formula described as above indicates selective preparation of hydrogen from carbon in an organic matter and water, which can be deemed as a thermochemical decomposition reaction of water.

As a heat source for driving the reaction, heat of combustion, generated upon oxidization of carbon contained in the organic matter, can be used, and besides, since CaO added to a reaction system releases reaction heat upon CaO reacting with water to be turned into $Ca(OH)_2$, such reaction heat as well can naturally be utilized, however, if heat supply is insufficient, heat may be added from outside, thereby promoting the reaction according to the formula (2).

In the case of using the matter X as the absorbent for carbon dioxide, temperature, not lower than a temperature thermodynamically determined, is necessary in order to cause a reaction as expressed by the following chemical formula to occur:

$$X+CO_2=XCO_2 \tag{3}$$

Accordingly, a temperature of the reaction system according the invention is inevitably not lower than the temperature at which the reaction according to the formula (3) occurs.

The most recommendable matter as the absorbent for carbon dioxide is CaO or $Ca(OH)_2$.

A hydroxide undergoes dehydration under a high temperature condition as follows:

$$Ca(OH)_2=CaO+H_2O \tag{4}$$

Accordingly, a reaction field becomes equal to that in the case of an identical species metal oxide being added at the outset.

Main reactions generate reaction heat described as follows:

$$C+H_2O=CO+H_2 \text{ endothermic reaction } 31.4 \text{ kcal} \tag{5}$$

$$H_2O+CO=CO_2+H_2 \text{ exothermic reaction}-9.9 \text{ kcal} \tag{6}$$

$$CaO+CO_2=CaCO_3 \text{ exothermic reaction}-42.5 \text{ kcal} \tag{7}$$

Accordingly, an overall reaction is expressed as follows:

$$C+2H_2O+CaO=CaCO_3+2H_2 \text{ exothermic reaction}-21.0 \text{ kcal} \tag{8}$$

It has turned out that the overall reaction is at least a net exothermic reaction, and is expected to proceed on its own from a thermodynamic point of view.

There has since been proposed a process of preparing hydrogen by causing coal powders to react with water in the supercritical state to thereby reduce the water in the supercritical state, wherein CaO in an amount at least sufficient to absorb all carbon dioxide as produced is caused to exist in a reaction system, and thermochemical decomposition of water is implemented substantially without an oxidizing agent added thereto, under a condition of a pressure not lower than 220 atm and a temperature not lower than 600° C.

As a result of studies continued further, the inventors have found out the following and has already submitted an application for patent on the basis thereof under Patent Application No. 2000-112558.

More specifically, since the condition of the pressure not lower than 220 atm and the supercritical state at not lower than 600° C. is quite severe from the viewpoint of apparatus manufacturing and operational safety, the inventors have been searching for a process of preparing hydrogen on a slightly easier condition bearing in mind embodying the invention in the form of an apparatus. The inventors have disclosed such a condition as above in a pending patent application (refer to JP, 2001-302206, A).

That is, in JP, 2001-302206, A, there is described the condition under which 0.5 g of pulverized Taiheiyo coal (coal with carbon content 76%, produced by Taiheiyo Coal Mine) is mixed with 3 g of CaO powders, which is in excess of the equivalent weight, a mixture is charged into a reactor to be heated up to 650° C., and a nitrogen gas from a high pressure nitrogen source is introduced into the reactor, maintaining a pressure inside the reactor at 90 atm. Further, with the elapse of 70 minutes after the introduction of the nitrogen gas, 7 cc of water is fed into a high-pressure steam generator by a pump, steam as generated is fed into the reactor with a temperature maintained at 650° C. to replace the nitrogen gas, and to undergo reaction for 20 minutes. There is further described that reactants are cooled after the reaction to be then fed into a cooler, and are further fed into a gas-liquid separator via a pressure adjuster after solid-liquid separation, thereby sending out a gas to an analytical instrument to measure a volume and species of the gas as formed.

The results of measurements with the passage of time are as shown in FIG. 5. Hydrogen makes up most of the gas as generated with a small amount of methane mixed therein. It is also disclosed that a trace of ethane, carbon monoxide, carbon dioxide, hydrogen sulfide, sulfur dioxide, and so forth are detected.

As is evident from FIG. 5, it has been confirmed that temperature rises up to 700° C. in a few minutes after steam is fed in, resulting in preferential occurrence of a chemical reaction $CaO+H_2O \rightarrow Ca(OH)_2$ (exothermic reaction), and further, it has been confirmed from the result after completion of the reaction that a chemical reaction $Ca(OH)_2 + CO_2 \rightarrow CaCO_3 + H_2O$ (exothermic reaction) has also proceeded.

As a result of continuous and intensive studies made by the inventors, the inventors have come to discover the fact that the following chemical reactions preferentially occur:

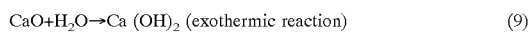
$$CaO+H_2O \rightarrow Ca(OH)_2 \text{ (exothermic reaction)} \qquad (9)$$

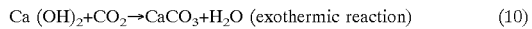
$$Ca(OH)_2 + CO_2 \rightarrow CaCO_3 + H_2O \text{ (exothermic reaction)} \qquad (10)$$

provided that a partial pressure of steam is adjusted under a condition of temperature in a range of 600° C. to 900° C. and a pressure at not lower than 30 atm.

The inventors have tracked the state in which CaO in the reactor undergoes a chemical change into $Ca(OH)_2$ by feeding steam into the reactor while maintaining the temperature of the reactor at 700° C. and varying the pressure thereof from 1 atm to 100 atm.

With the pressure at not higher than 10 atm, CaO is hardly turned into $Ca(OH)_2$. It has been confirmed however that with the pressure at 30 atm, there occurs the exothermic reaction represented by the chemical formula (9), resulting in a rise in the temperature of the reactor. Further, it has been confirmed that there occurs more intensely the reaction at the pressure of 50 atm, 70 atm, and 100 atm, respectively.

Further, those tests have brought about results totally unexpected by the inventors.

More specifically, it has turned out that an effective utilization ratio of $CaCO_3$ produced by way of $Ca(OH)_2$ when causing thermal decomposition $CaCO_3 \rightarrow CaO$ for reuse differs markedly as compared with that for $CaCO_3$ produced directly from CaO ($CaO \rightarrow CaCO_3$) by bypassing $Ca(OH)_2$.

Furthermore, it has been confirmed that a hydrogen yield is not lowered so much as anticipated even if a reaction pressure is lowered down to 30 atm.

After having continued studies still further, the inventors have attempted to provide a process of preparing hydrogen with a high production efficiency by examining from various angles the process of preparing hydrogen, including supply of raw materials, preparation of hydrogen, recovery and circulation of a matter for absorbing carbonic acid gas, generation and consumption of energy, and so forth, in order to design the invention in the form of a more specific plant on those conditions described for preparing hydrogen (refer to JP, 2001-302206, A).

The inventors have confirmed based on the results of tests that it is effective to turn raw material into impalpable powders.

That is, pulverized specimens composed of coal and CaO are charged into a reactor, nitrogen gas is fed from a high-pressure nitrogen source into the reactor while keeping the reactor at a temperature in a range of about 600° C. to 800° C., and a pressure is maintained on the order of from 30 to 60 atm. Thereafter, water in a predetermined amount according to a pump flow meter is fed into a high-pressure steam generator, and steam generated is fed into the reactor at the temperature kept in the range of about 600° C. to 800° C., thereby replacing the nitrogen gas. After completion of the reaction, reactants are fed into a cooler, and after solid-liquid separation, are further fed into a gas-liquid separator via a pressure adjuster, thereby sending out a gas to an analytical instrument.

It has turned out that specimens prepared by pressure-forming pulverized coal and CaO into pellets generate more hydrogen in comparison with specimens prepared simply by pulverizing coal and CaO without pelletization, thus indicating that it is effective to turn raw material into impalpable powders.

However, it is apparent that if coal and CaO in the form of impalpable powders can be fed into the reactor, this will be more efficient than a case of pelletizing coal and CaO after pulverization.

It has turned out that when a fluidized bed of a main reactor is supplied with water under a specific condition, and impalpable powders of CaO and coal, a mixture, composed of the impalpable powders of CaO and coal, reacts most efficiently, so that use is normally made of mixed impalpable powders in a range of 0.005 to 0.05 mm in grain size. However, a drawback with this practice has been found out in that if the mixed impalpable powders are too fine in gain size, the same will be carried away on air current out of the main reactor.

As a result of trying various processes as for conditions causing grain growth to occur in the main reactor even if the mixed impalpable powders are small in grain size, it has been found out that grain growth as desired occurs to the impalpable powders of coal and CaO by causing the mixed impalpable powders of coal powders and CaO to undergo grain growth in the fluidized bed while adjusting a steam partial pressure in the main reactor, thereby leading to development of the present invention.

SUMMARY OF THE INVENTION

That is, the present invention relates to a process of preparing hydrogen through thermochemical decomposition of water, wherein coal powders are caused to react with water in the presence of CaO under a condition of temperature in a range of 600° C. to 800° C. substantially without an oxidizing agent added thereto, thereby reducing water to form hydrogen, said process comprising the steps of rendering the coal powders and CaO into impalpable powders to form mixed impalpable powders, feeding steam generated from a steam generator and the mixed impalpable powders to a fluidized bed of a main reactor, and implementing thermochemical decomposition of water in the main reactor by causing the mixed impalpable powders of the coal powders and CaO to undergo grain growth in the fluidized bed while adjusting a steam partial pressure in the main reactor so as to be suited for a condition enabling CaO to form Ca$(OH)_2$.

Further, sulfur and halogen can be arrested in the main reactor by use of one species or not less than two species in combination, selected from the group consisting of NaOH, $Na_2CO_3$, KOH, and $K_2CO_3$, as appropriate to be thereby recovered as water soluble salts without allowing migration of sulfur and halogen into a formed gas.

With the present invention, "substantially without addition of the oxidizing agent thereto" signifies that there is no need not only for addition of an oxidizing agent but also for deliberate removal of air and so forth, contained in a specimen or raw material, upon charging the specimen or raw material into the reactor, which represents one of the important requirements in carrying out the present invention.

PREFERRED EMBODIMENTS OF THE INVENTION

Figure 1:
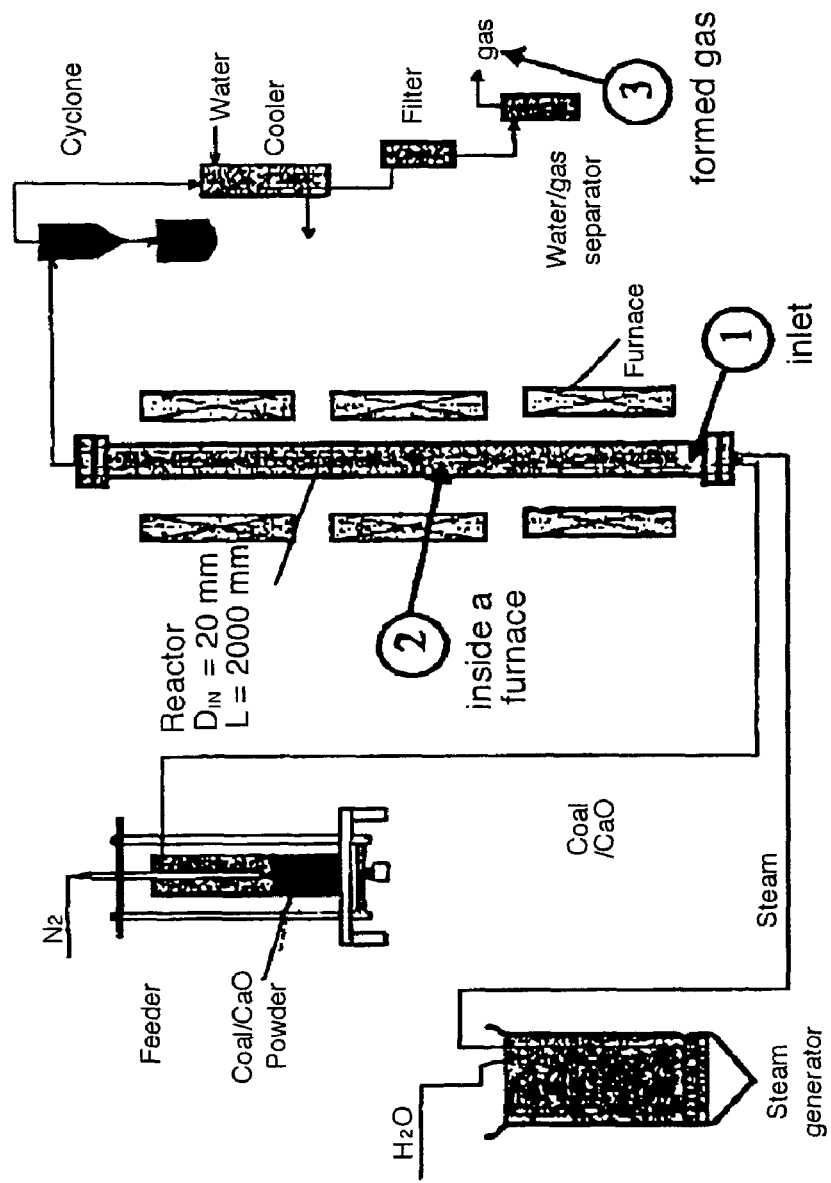
FIG. 1 is a schematic illustration showing a high-pressure reactor system for continuous supply of particulates, for use in carrying out an embodiment of a process of preparing hydrogen according to the invention.

With the invention, coal powders and CaO are first pulverized to a range of about 0.005 to 0.05 mm in grain size, and are fed by means of air flow transfer into a fluidized bed inside a gasification furnace (main reactor). An accompanying gas is a high-temperature gas, product gas (CH4), or other gas. At the same time, steam at a high temperature is fed into the furnace.

First, CaO reacts with $H_2O$ at the inlet of the furnace to be turned into Ca$(OH)_2$, thereby generating heat. Coal makes use of the heat, and undergoes thermal decomposition, forming gas, tar, and char. Thereafter, Ca$(OH)_2$, and char powders, together with granulated particles, are fluidized in the furnace. In the fluidized bed, Ca$(OH)_2$ absorbs $Co_2$ and $H_2S$ to thereby form $CaCO_3$ and CaS, further generating heat. By making use of the heat, tar and char react with steam to be gasified, thereby forming CO and hydrogen. As a result of various reactions such as reaction of CO with steam, thereby forming $H_2$ and $CO_2$, highly concentrated hydrogen is finally formed. The granulated particles after the reactions are discharged from the fluidized bed and the gasification furnace to thereby regenerate CaO in a roasting furnace (CaO regenerator) so as to be utilized again as an absorbent. Further, since the reaction of $CaCO_3 \rightarrow CaO$ proceeds in the roasting furnace (CaO regenerator), pure carbonic acid gas can be recovered. In addition, since the main reactor is of a moving bed type, not only gas and liquid but also solids can be taken out while keeping reactions proceeding. Also, the outer wall of the main reactor is kept at not higher than 600° C. It is necessary to prevent $CaCO_3$ from precipitating on the inner wall of the main reactor. As coal, for example, contains sulfur, sulfur can be arrested in the main reactor by use of one species or not less than two species in combination, selected from the group consisting of NaOH, $Na_2CO_3$, KOH, and $K_2CO_3$, however, desulfurization may be performed by the conventional method.

With the process of preparing hydrogen through thermal decomposition according to the invention, use of a heat exchanger as appropriate is necessary.

Preferred embodiments of the invention are described as follows:

(1) a process of preparing hydrogen through thermochemical decomposition of water, wherein coal powders are caused to react with water in the presence of CaO under a condition of temperature in a range of 600° C. to 800° C. substantially without an oxidizing agent added thereto, thereby reducing water to form hydrogen, comprising the steps of rendering the coal powders and CaO into impalpable powders to form mixed impalpable powders, feeding steam generated from a steam generator and the mixed impalpable powders to a fluidized bed of a main reactor, and implementing thermochemical decomposition of water in the main reactor by causing the mixed impalpable powders of the coal powders and CaO to undergo grain growth in the fluidized bed while adjusting a steam partial pressure in the main reactor so as to be suited for a condition enabling CaO to form Ca$(OH)_2$.

(2) a process of preparing hydrogen through thermochemical decomposition of water, under item (1) as above, wherein the steam partial pressure in the fluidized bed is at not less than 3 atm at 600° C. and is at not less than 40 atm at 800° C.

(3) a process of preparing hydrogen through thermochemical decomposition of water, under item (1) as above, wherein grain size of the mixed impalpable powders is in a range of 0.005 to 0.05 mm, and the grain size after the grain growth is in a range of 0.05 to 0.35 mm.

(4) a process of preparing hydrogen through thermochemical decomposition of water, under any of items (1) to (3) as above, wherein the main reactor is a fluidized bed reactor, and the outer wall of the main reactor is cooled to not higher than 600° C.

The invention will be more clearly understood with reference to the following example. FIG. 1 is an overall schematic illustration showing a high-pressure reactor system for continuous supply of particulates, for use in carrying out an embodiment of a process of preparing hydrogen according to the invention, however, it is to be understood that the invention is not limited thereto.

Coal and calcium oxide (Coal/CaO) in particulate form are fed by a carrier gas ($N_2$) to an inlet ① of a main reactor. At the same time, steam from a steam generator is fed to the inlet ① of the main reactor.

More specifically, Taiheiyo coal was pulverized with a ball mill, and was mixed with CaO powders available in the market at a predetermined mixing ratio, thereby preparing a mixed specimen composed of coal and CaO. The mixed specimen was quantifiably fed to the reactor from the lower part thereof. Concurrently, high-temperature steam at a high pressure was fed into a furnace. The mixed specimen rose from the inlet of the reactor while being kept in catalytic reaction with the steam, and was discharged from the upper part of the reactor. Solid particulates were recovered by a cyclone, and gas is separated from liquid in a filter. The gas was fed to an analytical instrument to analyze composition thereof.

(Solid and Gas Products Resulting from Gasification Reaction)

Figure 2:
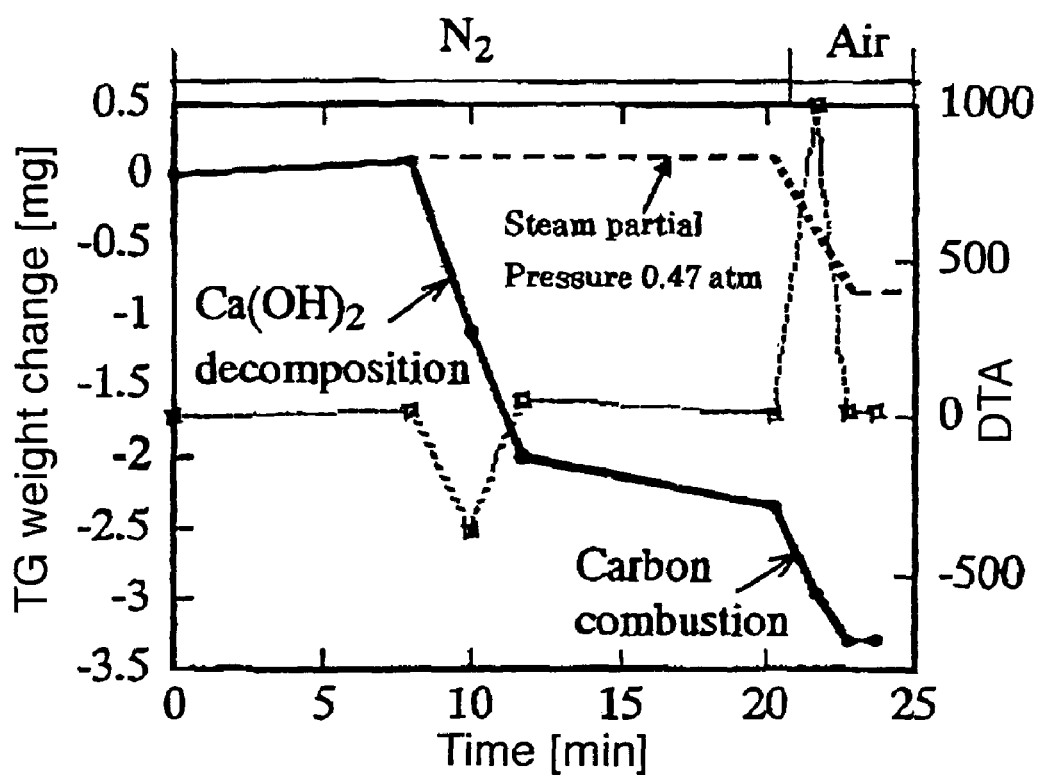
FIG. 2 is a schematic diagram showing results of solids analysis at the inlet of a furnace.
Figure 3:
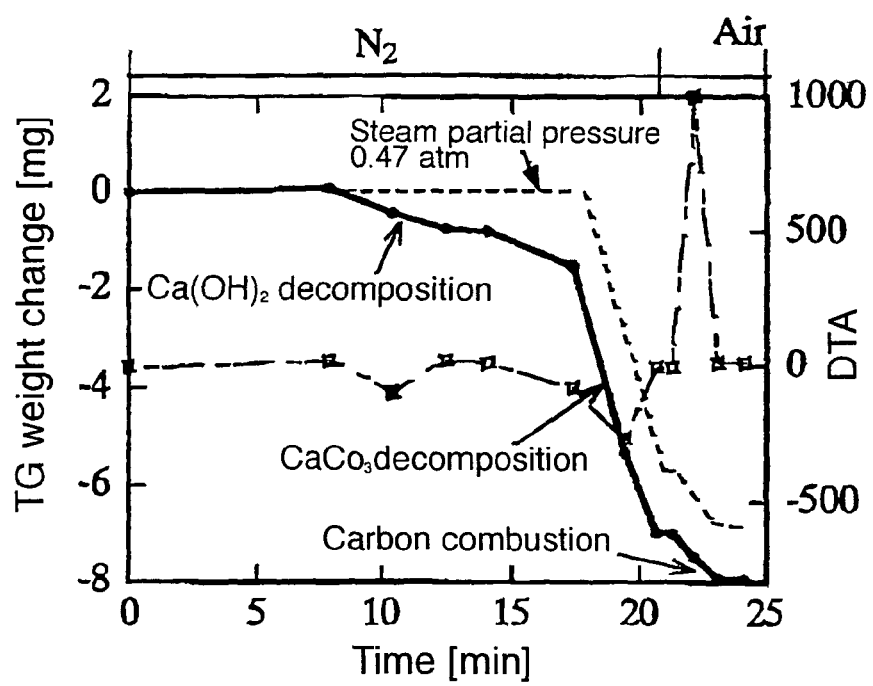
FIG. 3 is a schematic diagram showing results of solids analysis inside the furnace.

FIGS. 2 and 3 show results of solids analysis at the inlet of the furnace (a check point ①) and those of residual particulates inside the furnace (at a check point ②), respectively.

Based on results of TG analysis of the specimen at the inlet, only a decrease in weight of $Ca(OH)_2$ decomposition and that of carbon combustion were measured. It is clear from the decrease in the weight of $Ca(OH)_2$ decomposition that most of CaO as fed reacted with the steam to be turned into $Ca(OH)_2$. Further, it is clear from results of TG analysis of the residual particulates in the furnace that a decrease in weight of $Ca(OH)_2$ decomposition was significantly reduced, and a decrease in weight of $CaCO_3$ decomposition mainly accounted for TG weight change instead. This indicates that $Ca(OH)_2$ formed at the inlet has absorbed $CO_2$ gas generated from thermal decomposition/gasification of coal, turning into $CaCO_3$.

When CaO reacts with the steam, thereby first forming $Ca(OH)_2$, heat resulting from formation thereof can contribute directly to thermal decomposition of coal. Further, for CaO to absorb $CO_2$ by way of $Ca(OH)_2$, thereby turning into $CaCO_3$, has an advantageous effect of enhancing its activity as an absorbent. In addition, this will facilitate granulation of the specimen inside the furnace due to a eutectic effect of $Ca(OH)_2$ and $CaCO_3$. This indicates that a steam partial pressure plays a very large role. In this connection, it is evident from the figures that formation of $Ca(OH)_2$ does not occur if the steam partial pressure is lowered to 0.47 atm or lower.

Table 1 shows composition of a formed gas (at a check point ③). When looking at a formed gas only, except $N_2$ and $H_2O$, it is shown that $H_2$ gas accounts for about 80% of the formed gas and the remainder is mostly CH2, containing little of $CO_2$ and CO. Further, the formed gas hardly contains $H_2S$, $NH_3$, and tar.

The specimen, operation condition, and composition of the formed gas (at the check point ③) are summed up and shown in Table 1.

TABLE 1 operation condition and composition of a formed gas

| Specimen: | Coal/CaO ratio by wt. 1/2.1 | | grain size 0.005 mm | |
|---|---|---|---|---|
| Operation condition: | temperature 650° C. | pressure 50 atm | steam partial pressure 24 atm | operation time 2 hrs. |
| gas composition: | $H_2$ 78% | $CH_2$ 17% | $C_2H_6$ 2.7% | CO 0 | $CO_2$ 2.0% | $H_2S$ 2 ppm | $NH_3$ 0 | Tar 0 |

(Grain Growth of Residual Particulates in the Furnace)

Figure 4:
FIG. 4 is a scanning electron micrograph showing particulates after grain growth.
Figure 5:
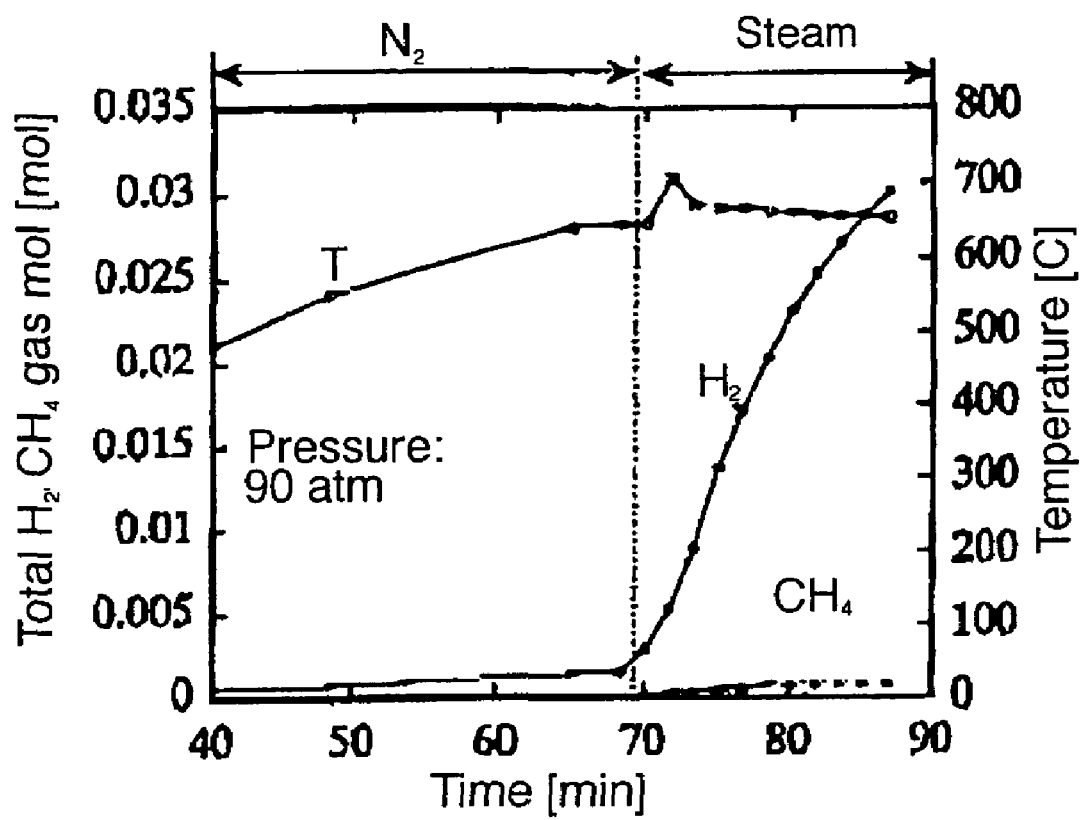
FIG. 5 is a schematic diagram showing results of measurements with the passage of time in the case of preparing hydrogen by the inventors under the conventional low-pressure condition.

FIG. 4 is a SEM showing the mixed specimen and residual particulates in the furnace. The specimen was on the order of about 5 μm in grain size. The grain size of the specimen after a test at 650° C. under 30 atm underwent a change so as to be only twice as large as that of the specimen before the test. However, a visual survey of the residual particulates in the furnace, after a test at 650° C. under 50 atm, shows that the residual particulates underwent fairly large growth in grain size and were granulated into round shape. The grain size after the growth was found various, and larger ones showed an increase to 250 μm, about 50 times as large as that of the specimen before the test.

This demonstrates that the mixed impalpable powders of the coal powders and CaO can be caused to undergo grain growth in the fluidized bed by adjusting the steam partial pressure in the main reactor and a gas flow rate so as to be suited for a condition enabling CaO to form $Ca(OH)_2$.

The results shown in Table 1 represent only a case of carrying out the invention under a specific condition, and it goes without saying that it is possible to control an amount of not only hydrogen gas but also carbonic acid gas as a byproduct by changing raw material, a reaction rate of the main reactor, CaO/ash to be pulled out, and so forth.

As a result of trying various processes as for conditions causing grain growth to occur in the main reactor even, it has been found out that grain growth as desired occurs by controlling the steam partial pressure in the main reactor and the flow rate. Hence, the invention can provide a process of preparing hydrogen through thermochemical decomposition of water, wherein a mixture of impalpable powders of CaO and coal powders can be fed directly to the fluidized bed of a reactor so as to react with each other most efficiently.

What is claimed is:

1. A process of preparing hydrogen through thermochemical decomposition of water, wherein coal powders are caused to react with water in the presence of CaO under a condition of a temperature in a range of 600° C. to 800° C., substantially without an oxidizing agent added thereto, thereby reducing water to form hydrogen, said process comprising the steps of rendering the coal powders and CaO into impalpable powders to form mixed impalpable powders, feeding steam generated from a steam generator and the mixed impalpable powders to a fluidized bed of a main reactor, and implementing thermochemical decomposition of water in the main reactor by causing the mixed impalpable powders of the coal powders and CaO to undergo grain growth in the fluidized bed while adjusting the steam partial pressure in the main reactor so as to enable CaO to form $Ca(OH)_2$.

2. A process of preparing hydrogen through thermochemical decomposition of water according to claim 1, wherein the steam partial pressure in the fluidized bed is not less than 3 atm at 600° C. and not less than 40 atm at 800° C.

3. A process of preparing hydrogen through thermochemical decomposition of water according to claim 1, wherein the grain size of the mixed impalpable powders is in a range of 0.005 to 0.05 mm, and the grain size after the grain growth is in a range of 0.05 to 0.35 mm.

4. A process of preparing hydrogen through thermochemical decomposition of water according to claim 1, wherein the main reactor is a fluidized bed reactor, and the outer wall of the main reactor is cooled to not higher than 600° C.

5. A process of preparing hydrogen through thermochemical decomposition of water according to claim 2, wherein the main reactor is a fluidized bed reactor, and the outer wall of the main reactor is cooled to not higher than 600° C.

6. A process of preparing hydrogen through thermochemical decomposition of water according to claim 3, wherein the main reactor is a fluidized bed reactor, and the outer wall of the main reactor is cooled to not higher than 600° C.

* * * * *